United States Patent
Koç et al.

(10) Patent No.: US 7,240,204 B1
(45) Date of Patent: Jul. 3, 2007

(54) SCALABLE AND UNIFIED MULTIPLICATION METHODS AND APPARATUS

(75) Inventors: Çetin K. Koç, Corvallis, OR (US); Erkay Savas, Corvallis, OR (US); Alexandre F. Tenca, Corvallis, OR (US)

(73) Assignee: State of Oregon Acting by and through the State Board of Higher Education on behalf of Oregon State University, Corvallis, OR (US)

(*) Notice: Subject to any disclaimer, the term of this patent is extended or adjusted under 35 U.S.C. 154(b) by 782 days.

(21) Appl. No.: 09/637,229

(22) Filed: Aug. 11, 2000

Related U.S. Application Data

(60) Provisional application No. 60/193,676, filed on Mar. 31, 2000.

(51) Int. Cl.
  H04L 9/00   (2006.01)
  G06J 1/00   (2006.01)
  G06F 7/44   (2006.01)
  G06F 7/52   (2006.01)

(52) U.S. Cl. .......... 713/174; 713/164; 708/7; 708/492; 708/503; 708/620

(58) Field of Classification Search .......... 708/492, 708/491, 620; 713/192, 174; 380/44, 47, 380/28

See application file for complete search history.

(56) References Cited

U.S. PATENT DOCUMENTS

| | | | |
|---|---|---|---|
| 4,322,577 A * | 3/1982 | Brandstrom | 380/37 |
| 4,763,332 A * | 8/1988 | Glover | 714/756 |
| 5,144,574 A | 9/1992 | Morita | |
| 5,321,752 A * | 6/1994 | Iwamura et al. | 713/174 |
| 5,349,551 A | 9/1994 | Petro | |
| 5,513,133 A | 4/1996 | Cressel et al. | |
| 5,742,530 A | 4/1998 | Gressel et al. | |
| 5,745,398 A * | 4/1998 | Monier | 708/492 |
| 5,867,412 A | 2/1999 | Suh | |
| 5,933,504 A * | 8/1999 | Vanstone et al. | 380/30 |
| 5,954,788 A | 9/1999 | Suh et al. | |
| 5,974,580 A * | 10/1999 | Zook et al. | 714/755 |
| 6,035,317 A * | 3/2000 | Guy | 708/620 |
| 6,049,815 A | 4/2000 | Lambert et al. | |
| 6,061,706 A * | 5/2000 | Gai et al. | 708/491 |
| 6,151,393 A | 11/2000 | Jeong | |
| 6,182,104 B1 * | 1/2001 | Foster et al. | 708/501 |
| 6,185,596 B1 * | 2/2001 | Hadad et al. | 708/491 |
| 6,209,016 B1 | 3/2001 | Hobson et al. | |
| 6,252,959 B1 * | 6/2001 | Paar et al. | 380/28 |
| 6,356,636 B1 * | 3/2002 | Foster et al. | 380/30 |
| 6,397,241 B1 * | 5/2002 | Glaser et al. | 708/625 |

(Continued)

OTHER PUBLICATIONS

EPS/Solutions, CypherCalc-Cryptographer's Calculotr, Mar. 3, 1999, http://cyphercalc.com. Last accessed: Feb. 26, 2004.*

(Continued)

*Primary Examiner*—Avaz Shiekh
*Assistant Examiner*—Christian LaForgia
(74) *Attorney, Agent, or Firm*—Klarquist Sparkman, LLP

(57) ABSTRACT

Scalable and unified multipliers for multiplication of cryptographic parameters represented as elements of either of the prime field (GF(p)) and the binary extension field (GF($2^m$)) include processing elements arranged to execute in pipeline stages. The processing elements are configurable to perform operations corresponding to either the prime field or the binary extension field. In an example, the processing elements include a dual-field adder having a field-select input that permits selection of a field arithmetic. In a representative example, multipliers are implemented as integrated circuits having processing units that each receive a single bit of one operand and partial words of the remaining operand.

15 Claims, 10 Drawing Sheets

U.S. PATENT DOCUMENTS

| | | | | |
|---|---|---|---|---|
| 6,560,336 | B1* | 5/2003 | Arita | 380/28 |
| 6,668,267 | B1* | 12/2003 | Pomet | 708/492 |
| 6,820,105 | B2* | 11/2004 | Blaker | 708/491 |
| 6,925,563 | B1* | 8/2005 | Jennings | 713/174 |
| 7,046,800 | B1* | 5/2006 | Tenca et al. | 380/28 |
| 2002/0013799 | A1* | 1/2002 | Blaker | 708/491 |
| 2002/0039418 | A1* | 4/2002 | Dror et al. | 380/28 |
| 2005/0033790 | A1* | 2/2005 | Hubert | 708/492 |
| 2005/0041811 | A1* | 2/2005 | Kobayashi et al. | 380/255 |

OTHER PUBLICATIONS

CypherCalc, the Cryptographers Calculator. Oct. 8, 1999. http://www.archive.org and http://www.cyphercalc.com. p. 1-9.*

Koc et al. Analyzing and Comparing Motogomery multiplication algorithms. 1996. IEEE. p. 26-33.*

M. Alain Guyot. Conception et Etude d'une Architecture Numerique de Haute Performance pour le Calcul de la Fonction Exponentielle Modulaire. Oct. 22, 1999.*

Kaliski, Jr., B.S., "The Montgomery Inverse and Its Applications," *IEEE Trans. on Computers 44*:1064-1065 (Aug. 1995).

Montgomery, P.L., "Modular Multiplication Without Trial Division," *Math. of Computation 44*:519-521 (Apr. 1985).

Koç, Ç.K. et al., "Analyzing and Comparing Montgomery Multiplication Algorithms," *IEEE Micro 16*:26-33 (Jun. 1996).

Dhem, J. et al., "SCALPS: Smart Card For Limited Payment Systems," *IEEE Micro 16*:42-51 (Jun. 1996).

Diffie, W., Hellman, M.E., "New Directions in Cryptography," *IEEE Trans. on Information Theory 22*:644-654 (1976).

Rivest, R.L. et al., "A Method for Obtaining Digital Signatures and Public-Key Cryptosystems," *Communications of the ACM 21*:120-126 (1978).

Koç, Ç.K., Acar, T., "Fast Software Exponentiation in GF($2^k$)" in *Proceedings, 13th Symposium on Computer Arithmetic*, pp. 225-231 (Jul. 1997) (T. Lang et al., editors).

Hamano, T. et al., "$O(n)$-Depth Circuit Algorithm for Modular Exponentiation" in *Proceedings, 12th Symposium on Computer Arithmetic*, pp. 188-192 (Jul. 1995) (S. Knowles, W.H. McAllister, editors).

Orup, H., "Simplifying Quotient Determination in High-radix Modular Multiplication" in *Proceedings, 12th Symposium on Computer Arithmetic*, pp. 193-199 (Jul. 1995) S. Knowles, W.H. McAllister, editors).

Bernal, A., Guyot, A., "Design of a Modular Multiplier Based on Montgomery's Algorithm" in *13th Conference on Design of Circuits and Integrated Systems*, pp. 680-685 (Nov. 1998).

Eldridge, S.E., Walter, C.D., "Hardware Implementation of Montgomery's Modular Multiplication Algorithm," *IEEE Trans. Computers 42*:693-699 (Jun. 1993).

Kornerup, P., "High-Radix Modular Multiplication for Cryptosystems" in *Proceedings, 11th Symposium on Computer Arithmetic*, pp. 277-283 (Jun. 1993) (E. Swartzlander et al., editors).

Walter, C.D., "Space/Time Trade-offs for Higher Radix Modular Multiplication Using Repeated Addition," *IEEE Trans. Computers 46*:139-141 (1997).

Royo, A., et al., "Design and Implementation of a Coprocessor for Cryptography Applications," *European Design and Test Conference*, pp. 213-217 (Mar. 1997).

Koç, Ç.K., Acar, T., Montgomery Multiplication in GF(2k), *Designs, Codes and Cryptography 14*:57-69 (1998).

Tenca, A.F., "Variable Long-Precision Arithmetic (VLPA) for Reconfigurable Coprocessor Architectures," Ph.D. Thesis, University of California at Los Angeles (Mar. 1998).

Hong et al., "New Modular Multiplication Algorithms for Fast Modular Exponentiation," EUROCRYPT '96 Proceedings, 166-177.

Walter, C., "Faster Modular Multiplication by Operand Scaling," Advances in Cyrptology Proc., Crypto '91, LNCS 576, 313-323 (1992).

Even, S., "Systolic Modular Multiplication," Crypto 90 Proc. Lecture Notes in Computer Science No. 537, 619-624.

Bosselaers et al., "Comparison of Three Modular Reduction Functions," Crypto '94, 175.186.

* cited by examiner

US 7,240,204 B1

SCALABLE AND UNIFIED MULTIPLICATION METHODS AND APPARATUS

CROSS-REFERENCE TO RELATED APPLICATIONS

The present application claims the benefit of U.S. Provisional Application No. 60/193,676, filed Mar. 31, 2000.

FIELD OF THE INVENTION

The invention pertains to scalable methods and apparatus for finite field multiplication in cryptographic systems.

BACKGROUND OF THE INVENTION

The basic arithmetic operations (i.e., addition, multiplication, and inversion) in prime and binary extension fields, $GF(p)$ and $GF(2^m)$, respectively, have numerous applications in cryptography. For example, RSA-based cryptography, Diffie-Hellman key exchange, elliptic curve cryptography, and the Digital Signature Standard (including the Elliptic Curve Digital Signature Algorithm) all use arithmetic operations in the finite field. These applications are described in, for example, W. Diffie and M. E. Hellman, "New Directions in Cryptography," *IEEE Trans. on Information Theory,* 22:644-654 (1976); N. Koblitz, "Elliptic Curve Cryptosystems," *Mathematics of Computation,* 48:203-209 (1987); A. J. Menezes, *Elliptic Curve Public Key Cryptosystems,* Kluwer Academic Publishers, Boston, Mass. (1993); J. J. Quisquater and C. Couvreur, "Fast Decipherment Algorithm for RSA Public-key Cryptosystem," *Electronics Letters* 18:905-907 (1982); and *Digital Signature Standard (DSS),* National Institute of Standards and Technology, FIPS PUB 186-2, January 2000. For most applications, implementation of the field multiplication operation is a significant design issue because field multiplication generally requires complex and expensive hardware or software.

The Montgomery multiplication algorithm described in, for example, P. L. Montgomery, "Modular Multiplication Without Trial Division," *Mathematics of Computation,* 44:519-521 (1985), is an efficient method for modular multiplication with an odd modulus and is useful in fast software implementations of the multiplication operation in prime fields $GF(p)$. The Montgomery multiplication algorithm substitutes simple bit-shift operations for the more complex division operations used in other methods of determining modular products. These bit-shift operations are readily implemented with general-purpose computers.

Montgomery multiplication has also been used to perform multiplication in the finite field $GF(2^m)$ as described in Ç.K. Koç and T. Acar, "Montgomery Multiplication in $GF(2^k)$," *Designs, Codes and Cryptography,* 14:57-69 (1998). Efficient software implementations of Montgomery multiplication in $GF(2^m)$ are possible, particularly if an irreducible polynomial generating the finite field is chosen arbitrarily.

Several variants of the Montgomery multiplication algorithm have been suggested for efficient software implementations with specific processors. See, for example, H. Orup, "Simplifying Quotient Determination in High-radix Modular Multiplication," in S. Knowles and W. H. McAllister, eds., *Proceedings, 12th Symposium on Computer Arithmetic, p.* 193-199, Bath, England, Jul. 19-21, 1995; Ç.K. Koç, T. Acar, and B. S. Kaliski Jr, "Analyzing and Comparing Montgomery Multiplication Algorithms," *IEEE Micro* 16:26-33 (1996).

Improved hardware implementations of Montgomery multiplication for limited precision operands have also been disclosed. See, for example, A. Bernal and A. Guyot, "Design of a Modular Multiplier Based on Montgomery's Algorithm," in 13*th Conference on Design of Circuits and Integrated Systems,* p. 680-685, Madrid, Spain, Nov. 17-20, 1998. Implementations using high-radix modular multipliers have also been suggested. See, for example, P. Kornerup, "High-radix Modular Multiplication for Cryptosystems," in E. Swartzlander, Jr. et al., eds., *Proceedings,* 11*th Symposium on Computer Arithmetic,* p. 277-283, Windsor, Ontario, Jun. 29-Jul. 2, 1993; and A. Royo et al., "Design and Implementation of a Coprocessor for Cryptography Applications," in *European Design and Test Conference,* p. 213-217, Paris, France, Mar. 17-20, 1997. Because high-radix Montgomery multiplication implementations introduce long critical paths and complex circuitry, such designs are generally unattractive for hardware implementations of Montgomery multiplication.

Scalable Montgomery multiplier designs for the finite field $GF(p)$ are disclosed in Ç.K. Koç and A. F. Tenca, U.S. patent application Ser. No. 09/621,020, filed Jun. 21, 2000, and A. F. Tenca and Ç.K. Koç, "A Scalable Architecture for Montgomery Multiplication," in Ç.K. Koç and C. Paar, eds., *Cryptographic Hardware and Embedded Systems,* Lecture Notes in Computer Science 1717:94-108, Springer Verlag, Berlin, Germany (1999), both of which are incorporated herein by reference. These scalable multipliers permit a fixed-area modular multiplication circuit (i.e., a circuit having a fixed precision) to be adapted to perform multiplication of operands of arbitrary precision.

Because of the importance of finite field multiplication in cryptographic systems, improved methods and apparatus for finite field multiplication are needed.

SUMMARY OF THE INVENTION

Scalable, unified multiplication methods and multipliers according to the invention execute multiplication of elements of either or both of the finite fields $GF(p)$ and $GF(2^m)$. A dual-field, scalable adder is provided for addition of elements of either a prime field $GF(p)$ or a binary extension field $GF(2^m)$. In a representative embodiment, the multiplier is an integrated circuit for use in a pipeline organization.

Representative embodiments of multiplication modules according to the invention include a first input and a second input configured to receive a first operand and a second operand represented as elements of a finite field. The modules also include an output configured to deliver a Montgomery product of the first operand and the second operand. The modules also include a field-select input configured to select multiplication of the first and second operands based on a selected finite field. In representative embodiments, the field select input is configurable to select a prime field or a binary extension field. In additional embodiments, the first operand is processed bit-wise and the second operand is processed word-wise.

In other embodiments, the second operand is divided into multiple words that are multiplied with bits of the first operand. Such modules include a dual-field adder that is configurable to execute addition with or without carry, based on a value supplied to the field select input.

According to another aspect of the invention, cryptographic processors are provided that include inputs for receiving a first and a second cryptographic parameter represented as elements of a finite field. The cryptographic processors also include a multiplication module configured to receive the cryptographic parameters from the inputs. The multiplication module includes processing units configured to determine a Montgomery product of the cryptographic parameters. To such end, each processing unit receives a bit corresponding to the first parameter and partial words of the second parameter. In representative embodiments, each processing unit is configured to communicate intermediate word values of the Montgomery product to a different processing unit.

Cryptographic processors according to the invention also include a field-select input in communication with the multiplication module for selection of an arithmetic operation in the multiplication module to be performed in accordance with GF(p) or GF($2^m$) arithmetic. In a particular example, the arithmetic operation selectable with the field select input is field addition. In other embodiments, the processing unit includes a dual-field adder. In yet other embodiments, the first and second cryptographic parameters are represented as m+1 bits and e words of word length w, wherein e=⌈(m+1)/w⌉.

According to yet another aspect of the invention, dual-field adders are provided that include a first input and a second input situated to receive elements of the field GF(2) or of the set {0, 1}. A field-select input is configured to direct an addition module to execute addition with carry or without carry according to a value supplied to the field-select input. In representative embodiments, the addition module includes at least one exclusive OR gate.

According to yet another aspect of the invention, methods of determining a Montgomery product of a first cryptographic parameter and a second cryptographic parameter are provided. The methods include representing the first parameter as a series of bits and representing the second parameter as a series of words. An intermediate value of a contribution to the Montgomery product is determined based on a first bit of the first parameter and the words of the second parameter in a first pipeline stage. In subsequent pipeline stages intermediate values of contributions to the Montgomery product are determined based on additional bits of the first parameter in corresponding pipeline stages that receive the words of the second parameter and intermediate values from a prior pipeline stage. In a specific example, intermediate values are determined based on a field-select input that selects an addition operation corresponding to addition with carry or without carry. Computer-readable media containing instructions for executing these methods are also provided.

According to yet another aspect of the invention, Montgomery multipliers are configured to determine a Montgomery product of a first operand and a second operand. The Montgomery multipliers include a field select input for selection of arithmetic operations corresponding to a prime field or a binary extension field and an output to which the Montgomery product is delivered. In representative examples, the multipliers include a dual-field adder that executes addition with carry or without carry, based on an input delivered to the field select input. In additional embodiments, the multipliers include a scalable Montgomery multiplication module.

These and other embodiments and features of the invention are described with reference to the accompanying drawings.

DETAILED DESCRIPTION

Figure 1:
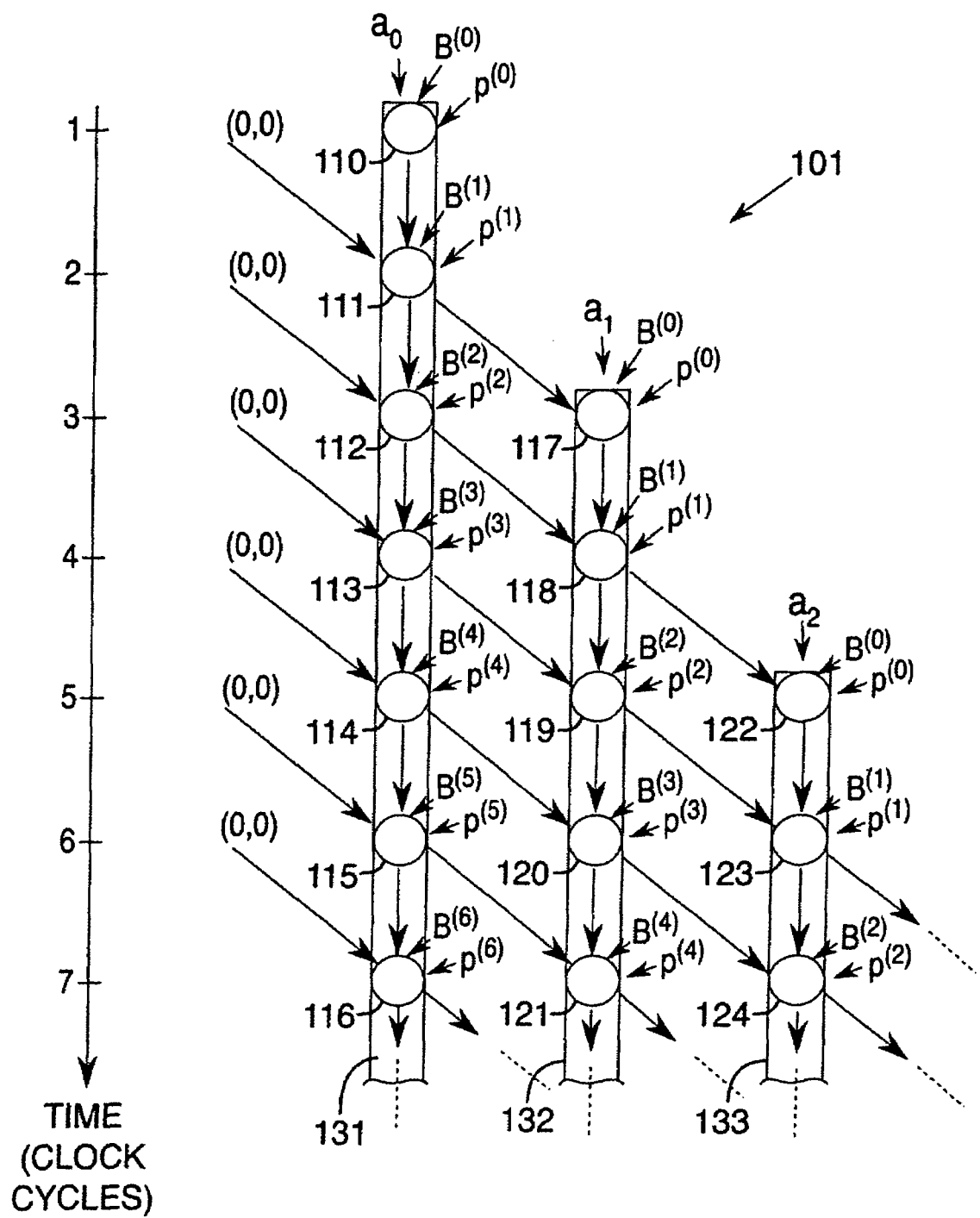
FIG. 1 is a dependency graph for a Montgomery multiplication method for a finite field GF(p) or a finite field GF($2^m$), wherein p is a prime number and m is a positive integer.

Methods and apparatus are provided for Montgomery multiplication of elements of the finite field GF(p), wherein p is a prime number, and the finite field GF($2^m$), wherein m is a positive integer. The field GF(p) is generated by the prime number p, and the field GF($2^m$) is generated by an arbitrary irreducible polynomial p(x). These methods and apparatus are suitable for multiplication of elements of either GF(p) or GF($2^m$) and are scalable, permitting multiplication of elements of arbitrary precision. Such methods and apparatus are referred to as unified and scalable. Increases in area or decreases in speed associated with such a unified multiplication module are acceptable in many applications. In addition, the design of such a module can involve only slightly more design effort than a multiplier for a single finite field, and no significant modification in circuit control logic is needed. Because of the magnitude of the design effort expended in designing a multiplier module or, more generally, a cryptographic coprocessor, a scalable and unified multiplier module that performs arithmetic in these two finite fields is advantageous. A unified multiplier that performs Montgomery multiplication in the finite fields GF(p) and GF($2^m$) can have a cost (measured as, for example, a circuit area needed to define the multiplier) that is only slightly greater than that of a multiplier for the finite field GF(p) alone. Therefore, in cryptographic systems using finite-field multiplication in both GF(p) and GF($2^m$), a significant savings can be achieved with a unified multiplier according to the invention.

Unified Multiplier Architecture

The prime and binary extension fields, GF(p) and GF($2^m$), respectively, have different properties, but, surprisingly, the elements of either of these finite fields can be represented in a computer system using similar data structures. In addition, methods for arithmetic operations in these fields can be arranged to be structurally similar, permitting design of unified multiplication modules. Such modules can implement Montgomery multiplication methods. For convenience, Montgomery multiplication is briefly reviewed below.

Montgomery Multiplication

A Montgomery product C of two integers A and B that are elements of the finite field GF(p) is defined as:

$$C=MonMul(A,B)=A \cdot B \cdot R^{-1}(\mathrm{mod}\ p), \quad (1)$$

wherein $R=2^m$, $A,B<p<R$, and p is an m-bit number. Such a product is readily determined using a method listed in Table 1 and discussed below.

To take advantage of the Montgomery multiplication method, elements to be multiplied are transformed into corresponding Montgomery images. For example, the field element A is transformed into an element $\overline{A}$ that is also an element of GF(p) according to a transformation $\overline{A}=A \cdot R$ (mod p). The element $\overline{A}$ is referred to as a Montgomery image of the element A, or, equivalently, $\overline{A}$ is said to be in the Montgomery domain. For elements $\overline{A}$ and $\overline{B}$ in the Montgomery domain, the Montgomery multiplication method determines the Montgomery image $\overline{C}$ of C as:

$$\overline{C}=\overline{A} \cdot \overline{B} \cdot R^{-1}(\mathrm{mod}\ p)=(A \cdot R) \cdot (B \cdot R) \cdot R^{-1}(\mathrm{mod}\ p)=C \cdot R\ (\mathrm{mod}\ p). \quad (2)$$

Transformation of the field elements A, B to corresponding Montgomery images $\overline{A}$, $\overline{B}$ and transformation of the Montgomery image $\overline{C}$ to the field element C can be performed with the MonMul function as follows:

$$A=MonMul(A,R^2)=A \cdot R^2 \cdot R^{-1}=A \cdot R(\mathrm{mod}\ p),$$

$$B=MonMul(B,R^2)=B \cdot R^2 \cdot R^{-1}=B \cdot R(\mathrm{mod}\ p),$$

$$C=MonMul(\overline{C},1)=C \cdot R \cdot R^{-1}=C(\mathrm{mod}\ p).$$

By precomputing and saving $R^2$ (mod p), only a single MonMul operation is needed for each transformation. Because Montgomery multiplication requires such transformations, performing a single modular multiplication using MonMul is not always advantageous. However, by eliminating the transformations, as disclosed in, for example, J. H. Oh and S. J. Moon, "Modular Multiplication Method," *IEEE Proceedings: Computers and Digital Techniques* 145: 317-318 (1998), procedures using only a few multiplications can be performed advantageously using Montgomery methods. Advantages of Montgomery multiplication are more apparent in multiplication-intensive calculations such as modular exponentiation or elliptic curve point operations. In order to fully exploit these advantages, all (or many) arithmetic operations are performed in the Montgomery domain, including the inversion operation. In addition, cryptosystems can be designed in which all calculations are performed in the Montgomery domain, eliminating the transformation operations.

Table 1 illustrates a bit-wise Montgomery multiplication procedure for obtaining a product $C=ABR^{-1}$ (mod p), wherein A, B, C are elements of the finite field GF(p) and are represented as m-bit row vectors $A=(a_{m-1}, \ldots, a_1, a_0)$, $B=(b_{m-1}, \ldots, b_1, b_0)$, and $C=(c_m, c_{m-1}, \ldots, c_1, c_0)$. For convenience, the Montgomery image notation is omitted. The method of Table 1 is suitable for any modulus n such that gcd(n,R)=1, wherein gcd(n,R) is a greatest common divisor of n and R. In the example of Table 1, n=p, wherein p is a prime number and this condition is satisfied.

For the finite field GF($2^m$), the definition of a Montgomery image and the Montgomery multiplication method are different because elements of GF($2^m$) are represented by polynomials of degree of at most m−1 that have coefficients that are elements of the binary field GF(2). For example, elements A and B of the field GF($2^m$) are represented as

TABLE 1

A bit-level Montgomery multiplication method for GF(p).

| | |
|---|---|
| Input: | A, B ∈ GF(p) and m = $\lceil \log_2 p \rceil$ |
| Output: | C ∈ GF(p) |
| Step 1: | C := 0 |
| Step 2: | for i = 0 to m − 1 |
| Step 3: | C := C + $a_i$B |
| Step 4: | C := C + $c_0$p |
| Step 5: | C := C/2 |
| Step 6: | if C ≥ p then C := C − p |
| Step 7: | return C | polynomials A(x) and B(x), wherein $$A(x)=a_{m-1}x^{m-1}+a_{m-2}x^{m-2}+\ldots+a_1x+a_0$$

$$B(x)=b_{m-1}x^{m-1}+b_{m-2}x^{m-2}+\ldots+b_1x+b_0,$$

and an irreducible monic degree-m polynomial $$p(x)=x^m+p_{m-1}x^{m-1}+p_{m-2}x^{m-2}+\ldots+p_1x+p_0$$

generates the field GF($2^m$). A Montgomery product C(x) of A(x) and B(x) is:

$$C(x)=A(x) \cdot B(x) \cdot R(x)^{-m}(\mathrm{mod}\ p(x)). \quad (3)$$

A Montgomery image of a polynomial A(x) is $\overline{A}(x)=A(x) \cdot x^m$ (mod p(x)). As with the field GF(p), operands are transformed into the Montgomery domain before performing Montgomery multiplication, and the product is then transformed out of the Montgomery domain. These transformations use a precomputed variable $R^2(x)=x^{2m}$ (mod p(x)) as follows:

$$\overline{A}(x)=MonMul(A,R^2(x))=A(x) \cdot R^2(x) \cdot R^{-1}(x)=A(x) \cdot R(x)\ (\mathrm{mod}\ p(x)),$$

$$\overline{B}(x)=MonMul(B,R^2(x))=B(x) \cdot R^2(x) \cdot R^{-1}(x)=B(x) \cdot R(x)(\mathrm{mod}\ p(x))$$

$$C(x)=MonMul(\overline{C},1)=C(x) \cdot R(x) \cdot R^{-1}(x)=C(x)(\mathrm{mod}\ p(x)).$$

A bit-level Montgomery multiplication algorithm for the field GF($2^m$) is given in Table 2. For convenience, the Montgomery image notation is omitted.

TABLE 2

A bit-level Montgomery multiplication method for GF($2^m$).

| Input: | A(x), B(x) ∈ GF($2^m$), p(x), and m |
|---|---|
| Output: | C(x) |
| Step 1: | C(x) := 0 |
| Step 2: | for i = to m − 1 |
| Step 3: | C(x) := C(x) + $a_i$B(x) |
| Step 4: | C(x) := C(x) + $c_0$p(x) |
| Step 5: | C(x) := C(x)/x |
| Step 6: | return C(x) |

The Montgomery methods and definitions for GF(p) and GF($2^m$) differ in that R=$2^m$ replaces R(x)=$x^m$. In addition, the subtraction operation of Step 6 of Table 1 is not required for the field GF($2^m$), and the addition operations of Table 1 and Table 2 are different. Addition in the finite field GF($2^m$) is bit-wise mod-2 addition, while addition in the field GF(p) requires carry propagation. Nevertheless, the methods have similarities. Both $x^m$ (for GF($2^m$)) and $2^m$ (for GF(p)) can be represented as a single 1 followed by $2^m$ zeros. In addition, the elements of the fields GF(p) and GF($2^m$) can be represented using the same data structures. For example, a representation of the elements of GF(7) for p=7 and the elements of GF($2^3$) for p(x)=$x^3$+x+1 is:

$GF(7)$={000, 001, 010, 011, 100, 101, 110}, $GF(2^3)$={000, 001, 010, 011, 100, 101, 110, 111}.

Thus, the same representations can be used for field elements of both fields, and only arithmetic operations on the field elements differ.

The methods of Tables 1 and 2 are bit-level methods that require full precision arithmetic. Word-level methods illustrated below permit scalability.

Multiple-Word Montgomery Multiplication Method for GF(p)

For a modulus of m-bit precision, at least e=⌈(m+1)/w⌉ words (each having w bits) are needed to represent elements of GF(p), wherein the function ⌈(m+1)/w⌉ represents the smallest integer that is greater than or equal to (m+1)/w. See, for example, Tenca and Koç, "A Scalable Architecture for Montgomery Multiplication," cited above. For multiplication of elements A, B of GF(p), the element B (the multiplicand) is scanned word-by-word and the element A (the multiplier) is scanned bit-by-bit. A is represented as a series of bits and B and p are represented as series of words as follows:

$B=(B^{(e-1)}, \ldots, B^{(1)}, B^{(0)})$, $A=(a_{m-1}, \ldots, a_1, a_0)$ $p=(p^{(e-1)}, \ldots, p^{(1)}, p^{(0)})$, wherein words are denoted with superscripts and bits are denoted with subscripts. For example, an ith bit of a kth word of the element B is represented as $B_i^{(k)}$. Words such as $B^{(k)}$ are referred to as partial words of B. A selected range of bits in the element B from position i to j, wherein j>i is represented as $B_{j\ldots i}$. Finally, $0^m$ represents an all-zero vector of m bits. A word-wise Montgomery multiplication method is listed in Table 3. Variables TC and TS represent temporary or intermediate values of a carry and sum contribution to a product expressed in carry-save (CS) form. The symbol | represents concatenation.

In Table 3, a sum is stored in two variables ($TC^{(j)}$,$TS^{(j)}$) that can grow as large as $2^{w+1}+2^w-3$, equal to a sum of three words on the right hand side of the assignments of steps 4, 8, 11, and 16. $TC^{(j)}$ and $TS^{(j)}$ are w-bit words, but $TC^{(j)}$ is treated as number multiplied by 2 because $TC^{(j)}$ represents a carry vector in CS form. At the end of Step 21, the result is expressed in CS form that is then converted into a nonredundant form. The addition of step 22 is full precision addition. If the result in step 23 is greater than the modulus p, then a subtraction operation is performed in Step 24 before returning the product C.

TABLE 3

A word-level Montgomery multiplication method for GF(p).

| Input: | A, B ∈ GF(p) and p |
|---|---|
| Output: | C ∈ GF(p) |
| Step 1: | (TC, TS) := ($0^m$, $0^m$) |
| Step 2: | (Carry0, Carry1) := (0, 0) |
| Step 3: | for i = 0 to m −1 |
| Step 4: | ($TC^{(0)}$, $TS^{(0)}$) := $a_i \cdot B^{(0)}$ + $TC^{(0)}$ + $TS^{(0)}$ |
| Step 5: | Carry0 := $TC_{w-1}^{(0)}$ |
| Step 6: | $TC^{(0)}$ := ($TC_{w-2\ldots 0}^{(0)}$\|0) |
| Step 7: | parity := $TS_0^{(0)}$ |
| Step 8: | ($TC^{(0)}$, $TS^{(0)}$) := parity · $p^{(0)}$ + $TC^{(0)}$ + $TS^{(0)}$ |
| Step 9: | $TS_{w-2\ldots 0}^{(0)}$ := $TS_{w-1\ldots 1}^{(0)}$ |
| Step 10: | for j = 1 to e − 1 |
| Step 11: | ($TC^{(j)}$, $TS^{(j)}$) := $a_i \cdot B^{(j)}$ + $TC^{(j)}$ + $TS^{(j)}$ |
| Step 12: | Carry1 := $TC_{w-1}^{(j)}$ |
| Step 13: | $TC_{w-1\ldots 1}^{(j)}$ := $TC_{w-2\ldots 0}^{(j)}$ |
| Step 14: | $TC_0^{(j)}$ := Carry0 |
| Step 15: | Carry0 := Carry1 |
| Step 16: | ($TC^{(j)}$, $TS^{(j)}$) := parity · $p^{(j)}$ + $TC^{(j)}$ + $TS^{(j)}$ |
| Step 17: | $TS_{w-1}^{(j-1)}$ := $TS_0^{(j)}$ |
| Step 18: | $TS_{w-2\ldots 0}^{(j)}$ := $TS_{w-1\ldots 1}^{(j)}$ |
| Step 19: | end for |
| Step 20: | $TS_{w-1}^{(e-1)}$ := 0 |
| Step 21: | end for |
| Step 22: | C := TC + TS |
| Step 23: | if C > p then |
| Step 24: | C := C − p |
| Step 25: | return C |

Multiple-Word Montgomery Multiplication Algorithm for GF($2^m$)

A Montgomery multiplication method for the finite field GF($2^m$) is given in Table 4. Because no carry computations are needed in GF($2^m$) arithmetic, intermediate addition operations are replaced by bit-wise XOR operations, represented below using the symbol ⊕.

TABLE 4

A word-level Montgomery multiplication method for GF($2^m$).

| Input: | A, B ∈ GF($2^m$) and p(x) |
|---|---|
| Output: | C ∈ GF($2^m$) |
| Step 1: | TS := $0^m$ |
| Step 2: | for i = 0 to m |
| Step 3: | $TS^{(0)}$ := $a_iB^{(0)}$ ⊕ $TS^{(0)}$ |
| Step 4: | parity := $TS_0^{(0)}$ |
| Step 5: | $TS^{(0)}$ := parity · $p^{(0)}$ ⊕ $TS^{(0)}$ |
| Step 6: | $TS_{w-2\ldots 0}^{(0)}$ := $TS_{w-1\ldots 1}^{(0)}$ |
| Step 7: | for j = 1 to e − 1 |
| Step 8: | $TS^{(j)}$ := $a_iB^{(j)}$ ⊕ $TS^{(j)}$ |
| Step 9: | $TS^{(j)}$ := parity · $p^{(j)}$ ⊕ $TS^{(j)}$ |
| Step 10: | $TS_{w-1}^{(j-1)}$ := $TS_0^{(j)}$ |
| Step 11: | $TS_{w-2\ldots 0}^{(j)}$ := $TS_{w-1\ldots 1}^{(j)}$ |
| Step 12: | end for |
| Step 13: | $TS_{w-1}^{(e-1)}$ := 0 |
| Step 14: | end for |
| Step 15: | C := TS |
| Step 16: | return C |

In Table 4, an index i (in an outer, or bit loop) runs from 0 to m. Since (m+1) bits are required to represent an irreducible polynomial of $GF(2^m)$, (m+1) bits are allocated to represent field elements.

The Montgomery multiplication method of Table 3 for $GF(p)$ can be modified to be more similar to that of Table 4 for $GF(2^m)$ by adjusting the number of words used to represent a field element of $GF(p)$ to $e=\lceil(m+1)/w\rceil$. m+1 bits can be used to represent elements of either $GF(p)$ or $GF(2^m)$.

Concurrency in Montgomery Multiplication

Concurrent computation of Montgomery products is obtained by exploiting parallelism among instructions in different iterations of i-loops (the bit loops) of the methods of Tables 3 and 4. The bit loops include steps 3-21 of Table 3 and steps 2-14 of Table 4. After selecting a least significant bit of the multiplier A, the first words of intermediate variables (TC,TS) are determined in two clock cycles, and then computations with the second bit of A can start. For example, after an inner loop (a j-loop or word loop) finishes execution with words j=0 and j=1 of the multiplicand B in an ith iteration of the outer (bit) loop, an (i+1)th iteration of the outer loop can begin. A dependency graph 101 of FIG. 1 illustrates these computations.

Referring to FIG. 1, the graph 101 includes task elements (TEs) 110-124 that are allocated to processing units (PUs) 131-133 that are configured to execute in a sequence of pipeline stages. Each of the PUs 131-133 performs an elementary computation in each iteration of the j-loop with the corresponding TEs, and each PU receives direct input of single bit of the operand A in each pipeline stage. The PU 131 receives $a_0, B^{(0)}, p^{(0)}$ at a TE 110 and computes an intermediate value that is communicated to the TE 111. The TE 111 receives $B^{(1)}, p^{(1)}, a_0$ and intermediate values from the TE 110 and computes another intermediate value that is communicated to the TE 112 and computes an intermediate value that is communicated to the TE 117 of the PU 132. After receiving a contribution from the TE 111, the PU 132 begins determining additional contributions to the Montgomery product based on the bit $a_1$. Thus, each of the PUs 131-133 determine contributions to the Montgomery product based on direct input of a different bit of the multiplier A. Each of the PUs 131-133 operates with each word of the multiplicand B in conjunction with a selected bit of the multiplier A. Beginning at the second clock cycle, at least one PU generates a word of a partial sum T=(TC,TS) in a carry-save (CS) form at each clock cycle. This word is communicated to a subsequent PU. Each of the PUs 131-133 completes computations with a selected bit in e+1 clock cycles and becomes available for further computation. If no PU is available to receive contributions generated by a last PU in the pipeline, then the pipeline stalls, and these contributions are saved or buffered until a PU becomes available. Extra buffers are provided for communication of contributions from the last PU (for example, the PU 133 in FIG. 1) to the first PU in the pipeline. In a worst case for which there is only a single PU, 2e extra buffers of length w can be provided to store partial sum words. In a final clock cycle of each column of PUs, the final PU in the column receives $p^{(e)}=B^{(e)}=0$. The TEs 110-124 can be identical.

A local control module in the PUs 131-133 (not shown in FIG. 1) retains a local control signal parity=$TS_0^{(0)}$ at the beginning of every pipeline stage and retains the local control signal for the subsequent e cycles to determine whether the modulus p is to be added to the partial sums. For example, the computations of step 16 of Table 3 and step 9 of Table 4 involve parity. This value is determined in the first clock cycle of execution of each of the PUs.

Figure 2:
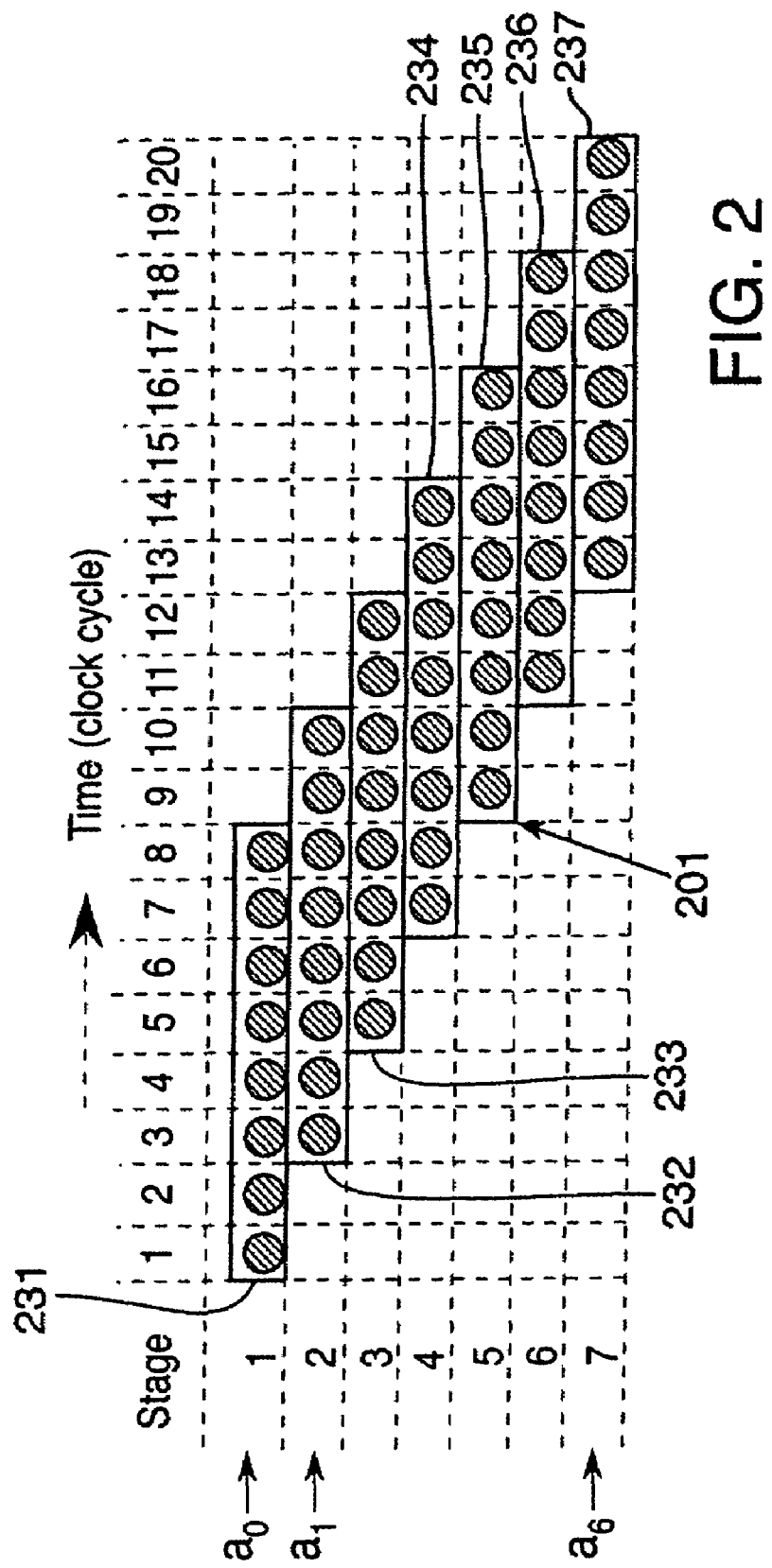
FIG. 2 is a schematic block diagram of pipeline computation of a Montgomery product of 7-bit operands using a word length w=1 bit.

Referring to FIG. 2, a multiplier 201 that includes PUs 231-237 is illustrated executing a computation with 7-bit operands and a word size w=1 bit. Thus, each bit of the multiplier A is delivered to a corresponding PU, and there are no pipeline stalls. There is a delay of two clock cycles between the beginning of execution for PUs that determine contributions based on $a_i$ and $a_{i+1}$, respectively. As shown in FIG. 2, a total execution time for the computation is 20 clock cycles.

A PU for each bit of the operands is not needed to avoid pipeline stall. If there are at least $\lceil(e+1)/2\rceil$ PUs, then pipeline stalls are unnecessary. For the example of FIG. 2, a multiplier that includes at least $\lceil 8/2\rceil=4$ PUs exhibits no pipeline stalls.

Figure 3:
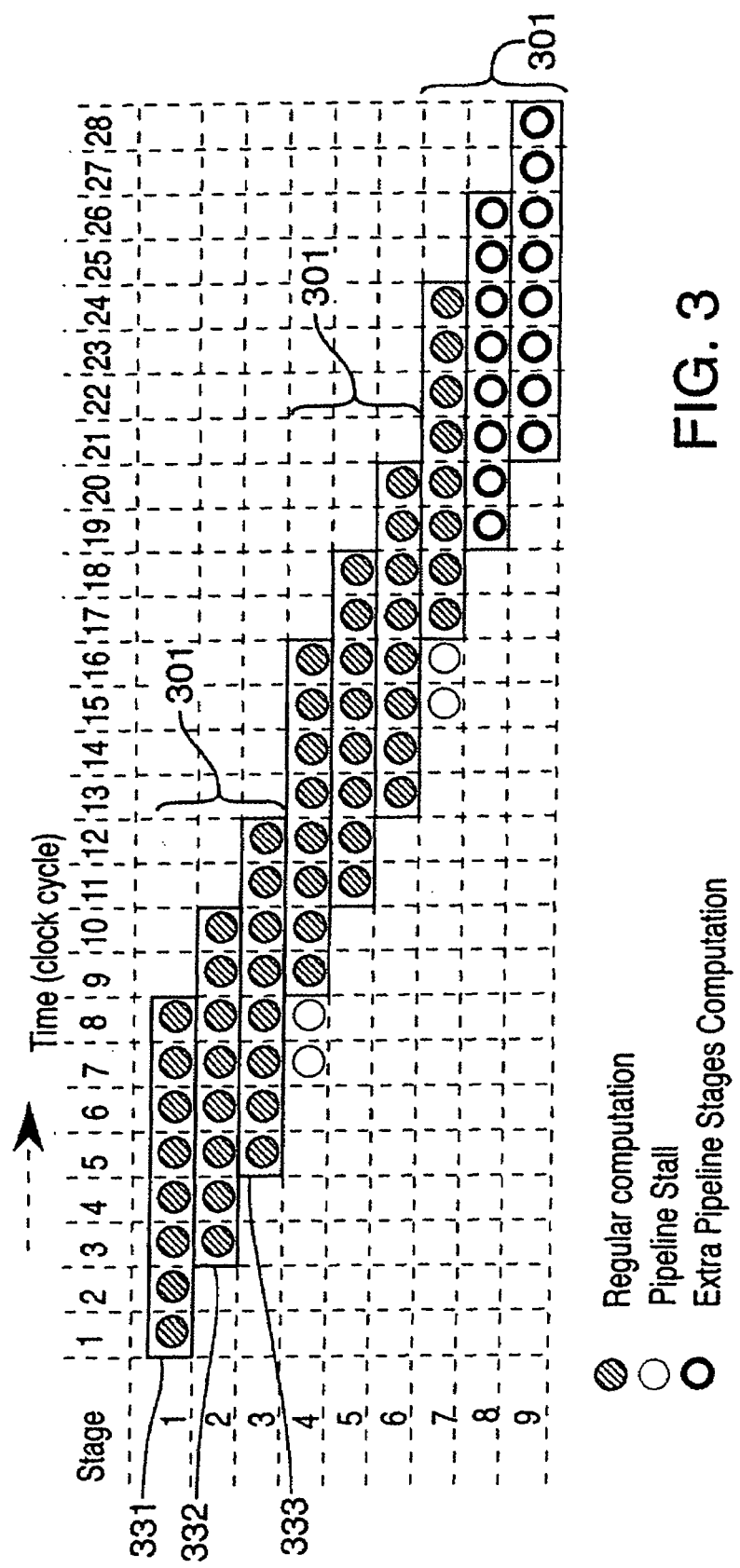
FIG. 3 is a schematic block diagram of pipeline computation of a Montgomery product of 7-bit operands using a word length w=1 illustrating pipeline stalls.

Referring to FIG. 3, pipeline stall is illustrated for computation with 7-bit operands and 1-bit words using a multiplier 301 that includes PUs 331-333. At clock cycles 7 and 15, the PU 331 is still computing results based on a zeroth and a third bit of A, respectively, and is unable to begin computations with another bit of A. Thus, pipeline operation stalls for two clock cycles. At the 9th and 17th cycles, the PU 331 becomes available and computation by the PU 331 with additional bits of A begins. Partial sums are stored during pipeline stall with a 4-bit buffer, not shown in FIG. 3. Pipeline stages 8 and 9 (beginning at clock cycle 19) are available for additional computation because all bits and words of A and B have been processed. Such pipeline stages are typically available whenever a number of clock cycles required by the PUs is not a multiple of the number of PUs. These additional pipeline stages can be configured to perform useful computations. Because the Montgomery product $C=A \cdot B \cdot 2^{-m}$ (mod p), wherein m is the number of bits in the modulus p, continuing computations in these last two pipeline cycles determines $C=A \cdot B \cdot 2^{-n}$ (mod p), wherein n>m is the smallest integer multiple of the number of PUs in the pipeline. Parameters of the Montgomery methods of Tables 3-4 can be selected correspondingly so that $R=2^n$, or $R=x^n$, for the finite fields $GF(p)$, $GF(2^m)$, respectively.

A total computation time CC (measured in clock cycles) is:

$$CC = \begin{cases} \left(\left\lceil\frac{m+1}{k}\right\rceil - 1\right)2k + e + 1 + 2(k-1) & \text{if } (e+1) < 2k, \\ \left(\left\lceil\frac{m+1}{k}\right\rceil\right)(e+1) + 2(k-1) & \text{otherwise,} \end{cases}$$

wherein k is a number of PUs in the pipeline. The first line gives CC when there are enough PUs to avoid pipeline stalls, while the second line corresponds to computations having pipeline stalls. At some clock cycles, some of the PUs are idle and a unit utilization is expressed as:

$$U = \frac{\text{Total number of clock cycles per bit of } A \times m}{\text{Total number of clock cycles} \times k} = \frac{(e+1) \cdot m}{CC \cdot k}.$$

Figure 4A:
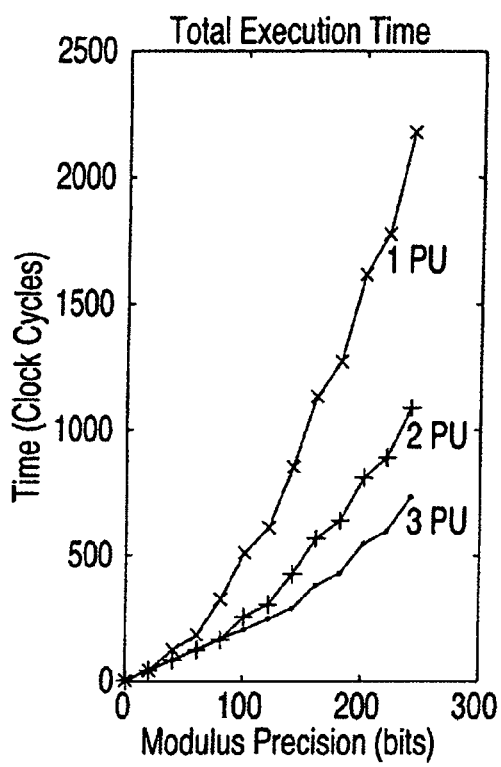
FIG. 4A is a graph of execution time as a function of modulus precision obtained with pipelines that use 1, 2, or 3 processing units for a word length w=32 bits.
Figure 4B:
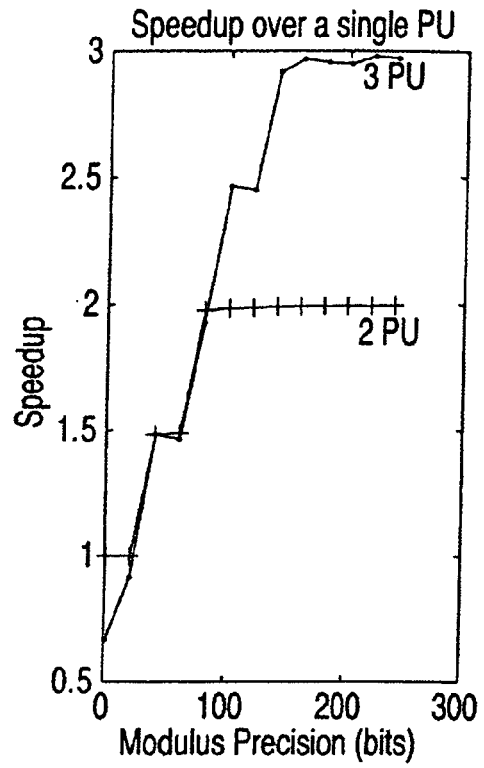
FIG. 4B is a graph of speedup obtained with two or three processing units with respect to computation time for a single processing unit (PU) as a function of modulus precision for a word length w=32 bits.
Figure 4C:
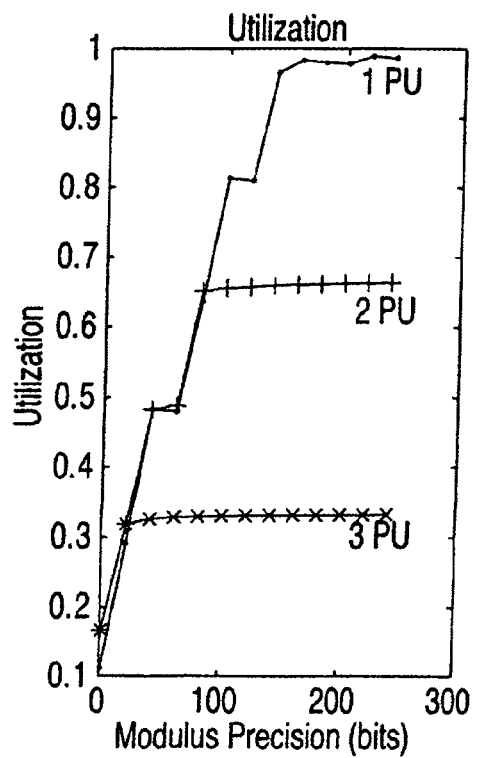
FIG. 4C is a graph of utilization obtained with 1, 2 or 3 processing units as a function of modulus precision for a word length w=32 bits.

FIGS. 4A-4C are graphs of total execution time CC, speedup introduced by use of more PUs relative to computation with a single PU (i.e., computation time relative to single PU computation), and unit utilization U as functions modulus precision. In FIGS. 4A-4C, a word length of w=32 is selected because multi-purpose microprocessors are readily available with 32-bit datapaths.

Scalable Architecture

Figure 5:
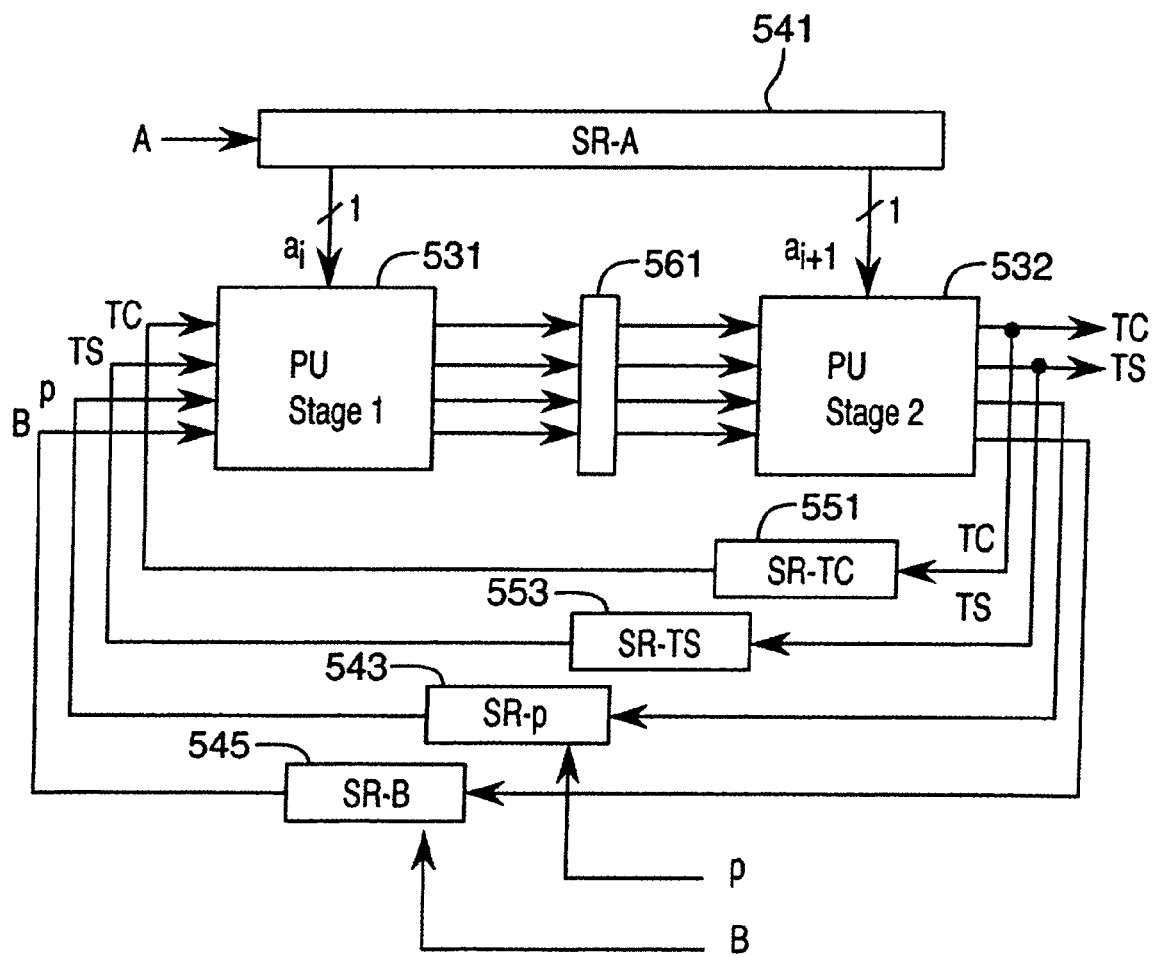
FIG. 5 is a schematic block diagram of a multiplier illustrating a pipeline organization based on two processing units.

FIG. 5 is a schematic block diagram of a portion of a multiplier that includes PUs 531, 532 arranged in a pipeline. The bits $a_i$ of the multiplier A are provided serially to the PUs 531, 532 by a shift register 541 (SR-A). Because bit values can be discarded after use, the shift register 541 can be a simple k-bit shift register, wherein k is a number of PUs in the pipeline. In the example of FIG. 5, a 2-bit shift register is sufficient. Respective words of the modulus p and the multiplicand B are provided by shift registers 543 (SR-p) and 545 (SR-B), respectively. The shift registers 543, 545 also can be simple shift registers. If there are no pipeline stalls, latches 561 between the PUs 531, 532 forward the modulus and multiplicand words to the next PU in the pipeline. However, if pipeline stalls occur, the modulus and multiplicand words generated at the end of a pipeline stage are delivered to the SR-p shift register 543 and the SR-B shift register 545, respectively. The length of the shift registers 543, 545 can be based on a number of pipeline stages (k) and the number of words (e) in the modulus p. The SR-p and SR-B shift registers 543, 545 can include registers to store an all-zero word needed for a last clock cycle in every stage (because $p^{(e)}=B^{(e)}=0$). The length of the SR-p and SR-B shift registers 543, 545 is at least:

$$L_1 = \begin{cases} e+1-2\cdot(k-1) & \text{if } (e+1) > 2k, \\ 1 & \text{otherwise.} \end{cases} \quad (4)$$

The width of the shift registers is equal to the wordlength w. Once a partial sum (TC,TS) is generated, it can be transmitted to a next pipeline stage without delay. However, shift registers 551 (SR-TC) and 553 (SR-TS) can store partial sums until the first pipeline stage is available. Each of the shift registers 551, 553 is typically $L_1$ words long and w-bits wide.

At most k-bits of the operand A are used in every clock cycle. For scalable multipliers, restrictions on operand size and any associated performance deterioration should be avoided or reduced, and the range of operand precision should not be limited. Since the lengths of the shift registers can depend on operand precision, designing full-precision registers within the multiplier may impose limitations on the range of precisions for which a multiplier operates. Therefore, register length in the multiplier (implemented as, for example, an application-specific integrated circuit) can be limited, and additional off-chip memory can be used for additional words. In such an implementation, register length does not depend on operand precision or the number of pipeline stages. Words needed early in computations are retrieved from memory to the registers first, and successive words are retrieved during computation. However, if the retrieval rate is too slow, pipeline stalls can occur.

The registers for TC, TS, B, and p can be loaded under the control of a local control circuit that includes one or more multiplexers (MUXes). Delays imposed by such MUXes generally do not create critical paths. A global control block is not shown in FIG. 5 for clarity. The functions and layout of such a global control block are determined based on Tables 3-4.

Processing Unit

Figure 6:
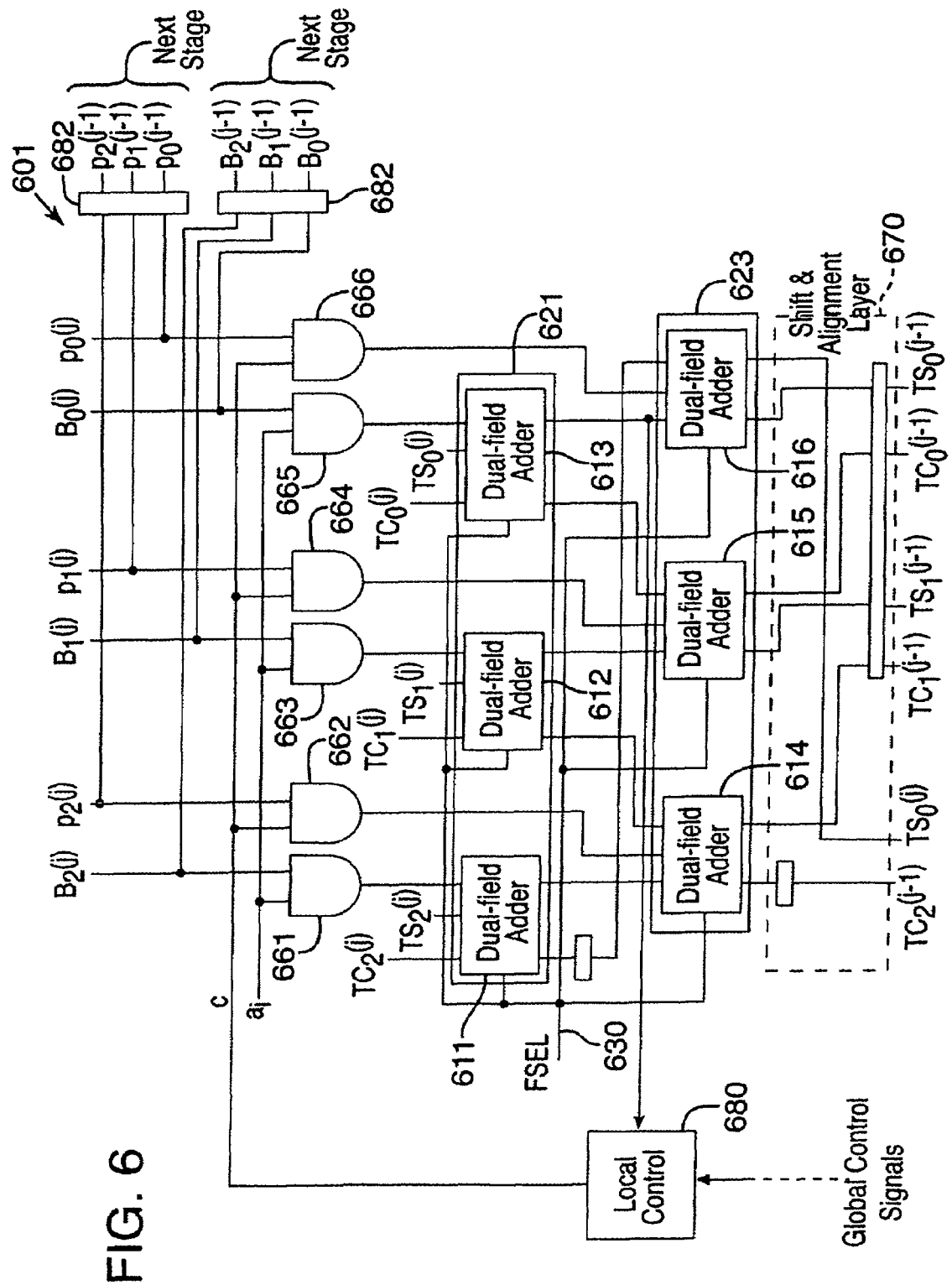
FIG. 6 is a schematic block diagram of a processing unit (PU) for a word length w=3 bits.

A block diagram of a PU 601 for w=3 is shown in FIG. 6. The PU 601 includes dual-field adders 611-613 arranged in a first layer 621 and dual-field adders 614-616 arranged in a second layer 623. As used herein, a dual-field adder is an adder that can perform addition both with carry and without carry. Addition without carry corresponds to the addition operation in the finite field GF(2). A field-select input (FSEL) 630 receives a control input for selection of addition for a selected field. The PU 601 receives inputs from a previous stage and/or from registers such as the shift registers SR-A, SR-B and SR-p of FIG. 5. The PU 601 includes AND gates 661-666 that provide products of, for example, $B_0^{(j)}$ and $a_i$ (AND gate 665) that are communicated to the adders 611-616. Delays are provided for p and B for the first cycle. Then, p, B, and a partial sum word are transmitted to a subsequent stage at a second clock cycle if a PU is available. The data path for the partial sum T=(TC,TS), expressed in redundant carry-save form (CS), is 2w bits long, w bits long for p and B, and 1 bit long for $a_i$. In the first cycle, parity is evaluated to control addition of the modulus p to the partial sums. The PU 601 also includes a shift and alignment layer 670 that receives and rearranges intermediate results produced by the adders 614-616 of the second layer 623.

The PU 601 also includes a local control block 680 that obtains a value of $TS_0^{(0)}$ in a first clock cycle of a pipeline stage and retains the value for the next e clock cycles. The PU 601 also includes latches 682 that forward words of p and B to the next pipeline stage.

Table 5 contains computational values produced by a PU such as the PU 601, based on e=5 words of word length w=3 for both of the fields GF(p) and GF($2^m$). In Table 5, the intermediate sum words TS(i) for GF($2^m$) are not in redundant CS form and the intermediate sum words for GF($2^m$) are represented in redundant CS form. However, one of the components of the CS representation is always zero, and the desired result can be obtained as a modulo-2 sum of the two CS components. The two components are summed at the end of the multiplication process.

Dual-Field Adder

Figure 7A:
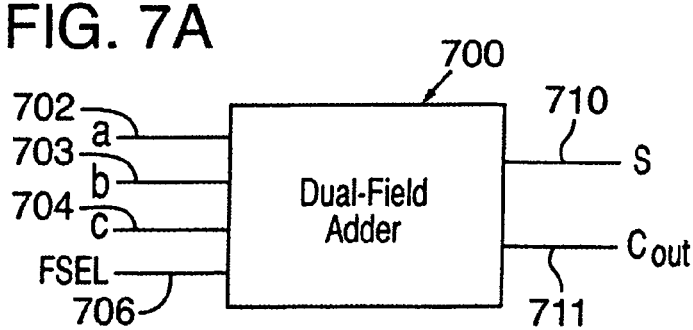
FIG. 7A is a schematic block diagram of a dual-field adder (DFA).

With reference to FIG. 7A, a dual-field adder (DFA) 700 includes operand inputs 702-704 and a field-select input (FSEL) 706. The DFA 701 also includes a bit-wise modulo-2 addition output (S) 710 and a carry output ($C_{out}$) 711. The DFA 700 is similar to a full-adder

TABLE 5

Inputs and outputs of the ith pipeline stage with w = 3 and e = 5 for both the finite field GF(p) (top) and the finite field GF($2^m$) (bottom).

| Cycle No | Inputs | Outputs |
|---|---|---|
| 1 | $TC^{(0)}, TS^{(0)}, a_i, B^{(0)}, P^{(0)}$ | $(0, TS_0^{(0)}); (0, 0); (0, 0)$ |
| 2 | $TC^{(1)}, TS^{(1)}, a_i, B^{(1)}, P^{(1)}$ | $(TC_2^{(0)}, TS_0^{(1)}); (TS_2^{(0)}, TC_1^{(0)}); (TS_1^{(0)}, TC_0^{(0)})$ |
| 3 | $TC^{(2)}, TS^{(2)}, a_i, B^{(2)}, P^{(2)}$ | $(TC_2^{(1)}, TS_0^{(2)}); (TS_2^{(1)}, TC_1^{(1)}); (TS_1^{(1)}, TC_0^{(1)})$ |
| 4 | $TC^{(3)}, TS^{(3)}, a_i, B^{(3)}, P^{(3)}$ | $(TC_2^{(2)}, TS_0^{(3)}); (TS_2^{(2)}, TC_1^{(2)}); (TS_1^{(2)}, TC_0^{(2)})$ |
| 5 | $TC^{(4)}, TS^{(4)}, a_i, B^{(4)}, P^{(4)}$ | $(TC_2^{(3)}, TS_0^{(4)}); (TS_2^{(3)}, TC_1^{(3)}); (TS_1^{(3)}, TC_0^{(3)})$ |
| 6 | 0, 0, 0, 0, 0 | $(TC_2^{(4)}, 0); (TS_2^{(4)}, TC_1^{(4)}); (TS_1^{(4)}, TC_0^{(4)})$ |
| 1 | $TC^{(0)}, TS^{(0)}, a_i, B^{(0)}, P^{(0)}$ | $(0, TS_0^{(0)}); (0, 0); (0, 0)$ |

TABLE 5-continued

Inputs and outputs of the ith pipeline stage with w = 3 and e = 5 for both the finite field GF(p) (top) and the finite field GF($2^m$) (bottom).

| Cycle No | Inputs | Outputs |
|---|---|---|
| 2 | $TC^{(1)}$, $TS^{(1)}$, $a_i$, $B^{(1)}$, $P^{(1)}$ | (0, $TS_0^{(1)}$); ($TS_2^{(0)}$, 0); ($TS_1^{(0)}$,0) |
| 3 | $TC^{(2)}$, $TS^{(2)}$, $a_i$, $B^{(2)}$, $P^{(2)}$ | (0, $TS_0^{(2)}$); ($TS_2^{(1)}$, 0); ($TS_1^{(1)}$,0) |
| 4 | $TC^{(3)}$, $TS^{(3)}$, $a_i$, $B^{(3)}$, $P^{(3)}$ | (0, $TS_0^{(3)}$); ($TS_2^{(2)}$, 0); ($TS_1^{(2)}$,0) |
| 5 | $TC^{(4)}$, $TS^{(4)}$, $a_i$, $B^{(4)}$, $P^{(4)}$ | (0, $TS_0^{(4)}$); ($TS_2^{(3)}$, 0); ($TS_1^{(3)}$,0) |
| 6 | 0, 0, 0, 0, 0 | (0, 0); ($TS_2^{(4)}$, 0); ($TS_1^{(4)}$,0) | but configured to perform bit addition with and without carry as controlled through the FSEL input 706. In an example, a logical 1 applied to the FSEL input 706 controls the DFA 700 to perform bit-wise addition with carry corresponding to GF(p) arithmetic. In contrast, a logical 0 controls the DFA 700 to perform GF($2^m$) arithmetic by setting the output 711 ($C_{out}$) to 0 regardless of any input values. The output S is a result of bit-wise modulo-2 addition of three input values supplied to the inputs 702-704. In GF($2^m$) arithmetic, at most two of the inputs 702-704 are non-zero.

Figure 7B:
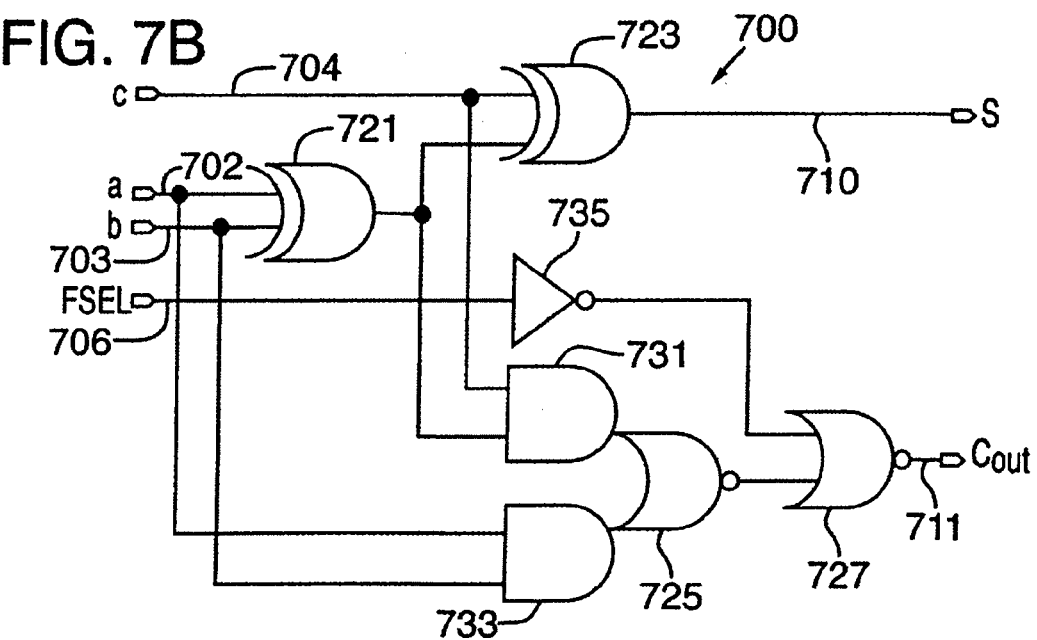
FIG. 7B is a schematic diagram of a circuit implementation of the dual field adder of FIG. 7A.

FIG. 7B is a schematic block diagram of an example of a circuit implementation of the DFA 700. The DFA 700 includes exclusive OR gates (XOR) 721, 723, NOR gates 725, 727, AND gates 731, 733, and an inverter 735. In this circuit implementation, the XOR gates 721, 723 are dominant in terms of circuit area and propagation time. As in a typical full-adder circuit, this circuit implementation has two XOR gates connected in series. Thus, propagation time of such a DFA is approximately the same as that of a standard full-adder and the circuit requires about the same area as a standard full-adder.

Multi-Purpose Word Adder/Subtractor

In the above examples, results are generated in the redundant CS form, and an additional sum operation at the end of the calculation produces the result in a nonredundant form using a field adder that operates in both GF(p) and GF($2^m$). A full-precision adder could be used but would increase critical-path delays and circuit area, and would limit scalability.

Figure 8:
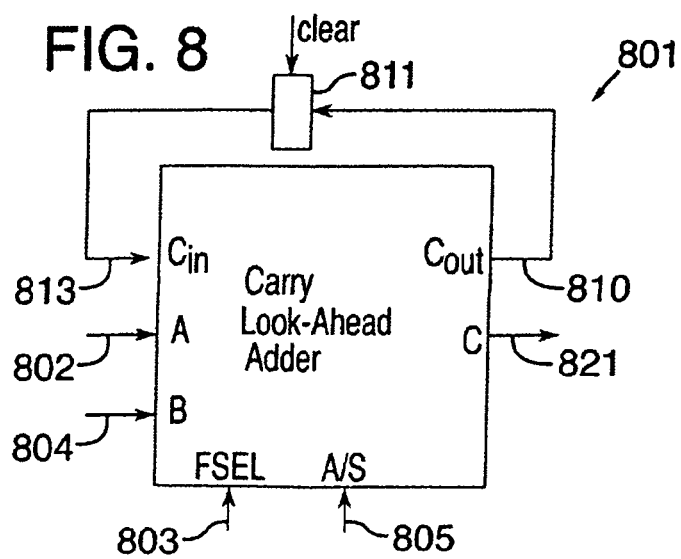
FIG. 8 is a schematic block diagram of a word adder.

FIG. 8 is a schematic diagram of a word adder 801 that is more suitable for a scalable multiplier. The word adder 801 has inputs 802, 804 for w-bit words A, B, respectively, and control inputs 803 (FSEL), 805(A/S) that enable selection of field arithmetic (FSEL), and addition or subtraction operations (A/S) whenever the field GF(p) is selected. The word adder 801 propagates the carry bit to subsequent word additions if the field GF(p) is selected. Thus, the carry from a word-addition operation is delivered to an output 810 ($C_{out}$) and delayed using a latch 811, and fed back into a carry input ($C_{in}$) 813 input of the adder 801 for subsequent word additions. With the field GF($2^m$) mode selected with the FSEL 803, the word adder 801 performs bit-wise modulo-2 addition of two input words, and the A/S input is not used. The word adder 801 provides words of the sum at each clock cycle at an output (C) 821.

The word adder 801 requires e+1 clock cycles to add two e-word operands. A final clock cycle generates a value of the carry variable and prepares the circuit for another operation by zeroing the output of the latch 811. At an (e+1)th clock cycle, inputs to the word adder are both $0^w$.

Figure 9:
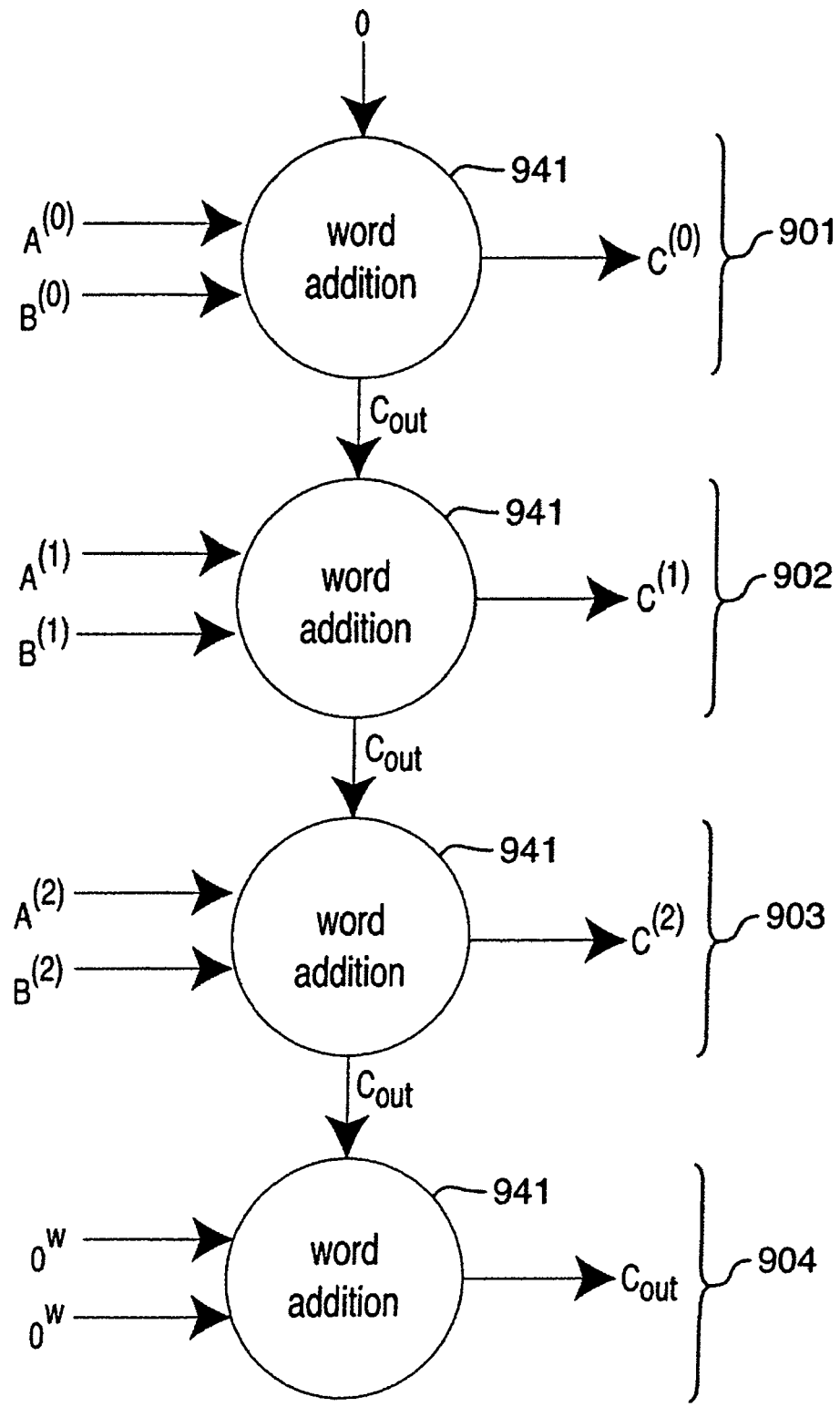
FIG. 9 is a schematic block diagram of multiprecision addition operation with e=3.

FIG. 9 illustrates addition of operands having three words. In a step 901, $A^{(0)}$ and $B^{(0)}$ are supplied to a word adder 941 along with a zero carry value. The word adder 941 generates a sum $C^{(0)}$ and a carry value $C_{out}$. The carry value $C_{out}$ and $A^{(1)}$ and $B^{(1)}$ are supplied to the word adder 941 in a second step 902 and a sum $C^{(1)}$ and a new value of $C_{out}$ obtained. Steps 903, 904 are similar. In the step 904, zero words $0^w$ are supplied to the A and B inputs of the adder 941 and a final carry value $C_{out}$ is produced.

A subtraction step is used in calculations in the finite field GF(p) (see step 24 of Table 3), and subtraction is conveniently provided in a word adder because a sum can be larger than the modulus p. This subtraction operation is used if the result is larger than the modulus. Thus, a comparison operation is needed. Control circuitry that conditionally performs the subtraction can be complex and can be external to the multiplier.

In many cryptographic applications, for example, elliptic-curve cryptosystems, field addition and multiplication operations are performed successively, and including a multiplier and an adder in a single cryptographic processor will reduce the overhead due to communication between the multiplier and adder. Properties of such a word-adder can be evaluated based on a word-adder design synthesized using Mentor Graphics or other CAD tools. Propagation time and circuit areas for such a word adder are listed in Table 6.

TABLE 6

Time and area costs of a multi-purpose word adder for words of lengths w = 16, 32, 64 bits.

| word length | Propagation Time (ns) | Area (in NAND gates) |
|---|---|---|
| 16 | 6.87 | 254 |
| 32 | 9.22 | 534 |
| 64 | 12.55 | 1128 |

Figure 10:
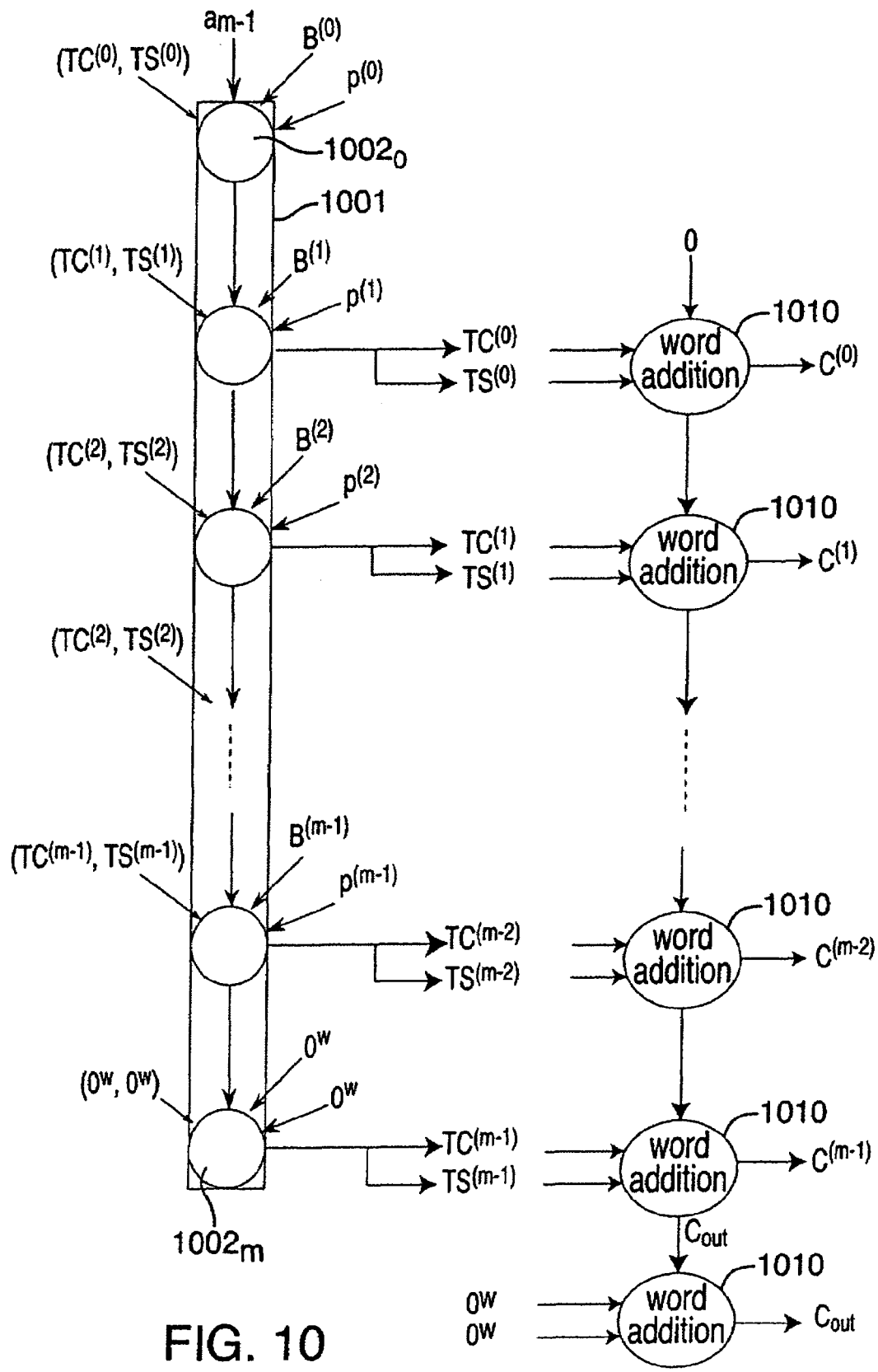
FIG. 10 is a schematic block diagram of a final pipeline stage, illustrating conversion of a result from a carry-save (CS) form to a non-redundant form.

FIG. 10 is a schematic block diagram of a final pipeline stage using a PU 1001 and a word adder 1010. The PU 1001 includes TEs $1002_0, \ldots, 1002_m$ that provide corresponding words ($TC^{(i)}, TS^{(i)}$) generated in each cycle for e clock cycles. The word adder 1010 add respective words to obtain respective result words $C^{(i)}$. Only one extra clock cycle in addition to the clock cycles used by the pipeline stages is needed to convert the result from the CS form to a nonredundant form.

CONCLUSION

While the scalable, unified multipliers and methods described herein are suitable for operands of arbitrary precision, cryptographic applications can be conveniently divided into two general ranges: (1) a high-precision range that includes operands having lengths of 512, 768 and 1024 bits, typically used in cryptographic systems using an exponentiation operation, and (2) a moderate-precision range that includes operands having lengths of 160, 192, 224, and 256 bits, typically used in elliptic-curve cryptosystems. Propagation delay of a PU is independent of the word length w whenever w is relatively small, and comparisons among different designs can be made assuming a fixed clock rate. Circuit areas dedicated to registers for the partial sum, the operands, and the modulus are approximately the same for all designs, and need not be considered in selecting among various multiplier module designs.

A scalable multiplier exhibits degraded performance relative to a single dedicated multiplier for w=m because extra clock cycles are used to perform word-serial computation. The benefit of using many pipeline stages with small word lengths offers diminishing performance improvement as the number of pipeline stages is increased and the word length decreased. Therefore, there is generally an optimum multiplier configuration. To select a particular multiplier configuration, multipliers can be synthesized using computer-aided design tools such as those available from Mentor Graphics. In a representative example, a 1.2 μm CMOS technology was selected for a multiplier, and a cell area for a word size w is calculated as:

$$A_{cell}(w)=48.5w \qquad (5)$$

units. In comparison, a 2-input NAND gate requires 0.94 units. In a pipelined organization, areas required by interstage latches can be important, and this area is calculated as $$A_{latch}(w)=8.32w \qquad (6)$$

units. Thus, the area of a pipeline with k processing elements is given as $$A_{pipe}(k,w)=(k-1)A_{latch}(w)+kA_{cell}(w)=56,82kw-8.32w \qquad (7)$$

units. For a fixed area, different multiplier configurations can be evaluated and a suitable configuration selected for a particular application.

Figure 11A:
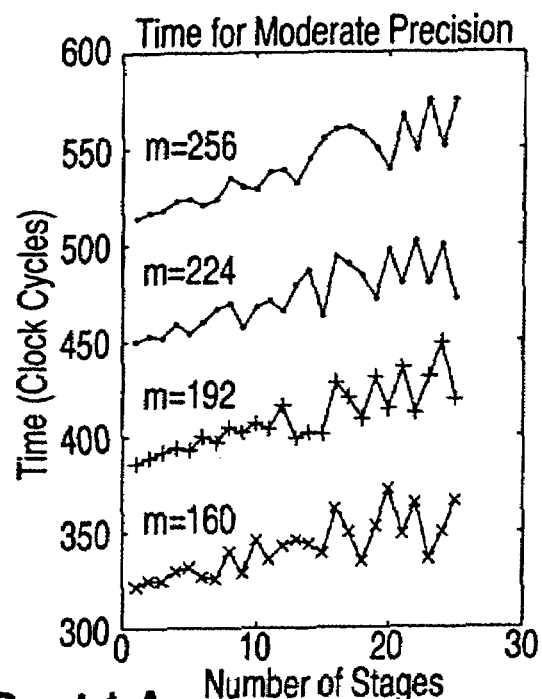
FIG. 11A is a graph of execution time for Montgomery multiplication of medium-precision operands as a function of a number of pipeline stages for a fixed circuit area corresponding to 15,000 gates.
Figure 11B:
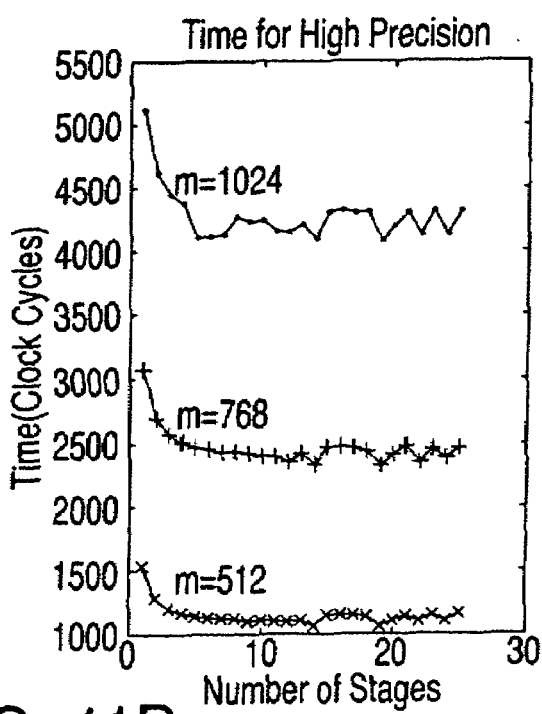
FIG. 11B is a graph of execution time for Montgomery multiplication of high-precision operands as a function of a number of pipeline stages for a fixed circuit area corresponding to 15,000 gates.

With reference to FIGS. 11A-11B, computation times are graphed as a function of number of pipeline stages for moduli of various precisions assuming a fixed circuit area corresponding to 15,000 gates. As seen in FIGS. 11A-11B, for both moderate and high precision applications, between 5 and 10 pipeline stages are likely to give near optimum performance. For high-precision applications, fewer than 5 stages yields poor performance because the fixed circuit area is inadequate for large word lengths and pipeline stalls become significant. A small number of pipeline stages with long word lengths provides acceptable performance in the moderate-precision range but performance degrades significantly as operand precision increases. The use of five or more pipeline stages controls this performance degradation. Multipliers based on large numbers of pipeline stages are generally inferior because high utilization of the PUs is achieved only for high-precision applications, and execution times may have undesirable oscillations. Such oscillations are produced by extra stages at the end of the computations, and an under-utilization of stages in the pipeline because the number of words e and the number of stages k are not matched. Based on a synthesized multiplier, clock cycle times as short as about 11 nanoseconds (clock rates of about 90 MHz) can be realized in 1.2 μm CMOS. Using CMOS technologies having smaller feature sizes, faster clock rates can be achieved.

In order to compare a hardware multiplier to a software multiplier, computation times for both multipliers are needed. Because it is generally difficult to compare hardware and software multipliers, a processor having a similar clock rates and implemented in a similar circuit technology is used. As an example, an ARM microprocessor, such as described in S. Furber, *ARM System Architecture*, Addison-Wesley, Reading, Mass. (1997), having an 80-MHz clock rate, is selected for comparison. Such an ARM and a multiplier as described above are compared using the same clock rate (80 MHz) and using a multiplier based on a word length w=32 and k=7 pipeline stages. The Montgomery multiplication method is implemented on the ARM processor in the ARM assembly language and optimized. Table 7 contains execution times and speedup of the multiplier with respect to a software implementation on the ARM processor.

TABLE 7

Execution times of hardware and software implementations of GF(p) multiplication.

| precision | Hardware (μs) (80 MHz, w = 32, k = 7) | Software (μs) (on ARM with Assembly) | speedup |
|---|---|---|---|
| 160 | 4.1 | 18.3 | 4.46 |
| 192 | 5.0 | 25.1 | 5.02 |
| 224 | 5.9 | 33.2 | 5.63 |
| 256 | 6.6 | 42.3 | 6.41 |
| 1024 | 61 | 570 | 9.34 |

The invention is described above with reference to example embodiments, but variations and modifications will be apparent to those skilled in the art. For example, multipliers for either the field GF(p) or GF($2^m$) alone can be provided, and unified, scalable software modules can be provided and stored in a computer-readable medium for execution on a general purpose computer or other computer, or a cryptographic processor. The multipliers and methods according to the invention permit multiplication of various cryptographic parameters including plaintext, ciphertext, authentication codes, public keys, private keys, and hash codes.

What is claimed is:

1. A cryptographic processor, comprising:
inputs for receiving a first and a second cryptographic parameter represented as elements of a finite field;
a multiplication module configured to receive the cryptographic parameters from the inputs, the multiplication module including a first processing unit and a second processing unit configured to determine a Montgomery product of the cryptographic parameters, the first processing unit and the second processing unit configured to receive a first bit and a second bit corresponding to the first parameter, respectively, and partial words of the second parameter; and
a field-type input in communication with the multiplication module for selection of an arithmetic operation in the multiplication module to be performed in accordance with GF(p) or GF($2^m$) arithmetic, wherein GF(p) is a prime field, GF($2^m$) is a binary extension field, p is a positive prime number, and m is a positive integer.

2. The processor of claim 1, wherein the first processing unit is configured to communicate intermediate values of partial words of the Montgomery product to the second processing unit.

3. The processor of claim 2, wherein the first and second cryptographic parameters are represented as m bits and e words of word length w, wherein e=⌈(m+1)/w⌉, and m, e, and w are positive integers.

4. The processor of claim 1, wherein the arithmetic operation selectable with the field-type input is field addition.

5. The processor of claim 4, further comprising a dual-field adder in communication with the field-type input.

6. The processor of claim 5, wherein the first and second cryptographic parameters are represented as m bits and e words of word length w, wherein e=⌈(m+1)/w⌉, and m, e, and w are positive integers.

7. The processor of claim 4, wherein the first and second cryptographic parameters are represented as m bits and e words of word length w, wherein e=⌈(m+1)/w⌉, and m, e, and w are positive integers.

8. The cryptographic processor of claim 1, wherein the multiplication module further comprises a third processing unit and a fourth processing unit configured to receive a third bit and a fourth bit, respectively, corresponding to the first parameter and partial words of the second parameter.

9. The processor of claim 1, further comprising a dual-field adder in communication with the field-type input.

10. The processor of claim 9, wherein the dual-field adder is configured to selectively execute addition corresponding to addition with carry or without carry based on the field-type input.

11. The processor of claim 1, wherein the first and second cryptographic parameters are represented as m bits and e words of word length w, wherein $e = \lceil (m+1)/w \rceil$, and m, e, and w are positive integers.

12. A method of determining a Montgomery product of a first cryptographic parameter and a second cryptographic parameter, the method comprising:
    representing the first cryptographic parameter as a series of bits;
    representing the second cryptographic parameter and a modulus as a series of words;
    processing a first bit of the first parameter with each word of the modulus and each word of the second parameter to produce a first series of intermediate values and a contribution to the Montgomery product based on the first bit;
    processing a second bit of the first parameter with each word of the modulus and each word of the second parameter, and a corresponding intermediate value from the first series of intermediate values to produce a second series of intermediate values and a contribution to the Montgomery product based on the second bit, wherein the first series of intermediate values and the second series of intermediate values are determined based on a field-type input that selects an arithmetic operation to be performed in accordance with $GF(p)$ or $GF(2^m)$ arithmetic, wherein $GF(p)$ is a prime field, $GF(2^m)$ is a binary extension field, p is a positive prime number, and m is a positive integer,
    combining the first contribution and the second contribution; and
    using the combination of the first and second contributions in a cryptographic process.

13. A computer-readable medium containing instructions for executing the method of claim 12.

14. The method of claim 12, further comprising selecting an addition operation based on the field-type input.

15. The method of claim 14, wherein the selected addition operation corresponds to addition with carry or without carry.

* * * * *